(12) United States Patent
Kim

(10) Patent No.: US 11,491,938 B2
(45) Date of Patent: Nov. 8, 2022

(54) VEHICLE AND CONTROL METHOD THEREOF

(71) Applicants: HYUNDAI MOTOR COMPANY, Seoul (KR); KIA Corporation, Seoul (KR)

(72) Inventor: Min Seok Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 17/331,233

(22) Filed: May 26, 2021

(65) Prior Publication Data
US 2022/0105890 A1    Apr. 7, 2022

(30) Foreign Application Priority Data
Oct. 6, 2020 (KR) .................. 10-2020-0128470

(51) Int. Cl.
*B60R 21/0132* (2006.01)
*B60R 21/0134* (2006.01)
*B60R 21/015* (2006.01)
*B60R 21/01* (2006.01)

(52) U.S. Cl.
CPC ...... *B60R 21/0134* (2013.01); *B60R 21/0132* (2013.01); *B60R 21/01544* (2014.10); *B60R 21/01552* (2014.10); *B60R 21/01556* (2014.10); *B60R 2021/01218* (2013.01); *B60R 2021/01272* (2013.01)

(58) Field of Classification Search
CPC .......... B60R 21/0134; B60R 21/01544; B60R 21/01552; B60R 21/0132; B60R 21/01556; B60R 2021/01218; B60R 2021/01272
See application file for complete search history.

*Primary Examiner* — Mathew Franklin Gordon
(74) *Attorney, Agent, or Firm* — Slater Matsil, LLP

(57) ABSTRACT

A vehicle includes a safety device, a camera sensor configured to detect an obstacle around the vehicle, a radar sensor configured to detect the obstacle around the vehicle, and a controller configured to predict a collision state and a collision position of the vehicle through the camera sensor and the radar sensor, determine whether to control the safety device based on at least one of a vehicle type, a collision speed, a seat position of an occupant, whether the occupant wears a seat belt, a gender of the occupant, whether the occupant is an infant, or a size of the occupant, in response to a prediction result, and control the safety device depending on device determination result.

18 Claims, 8 Drawing Sheets

FIG. 3

| COLLISION SPEED | OCCUPANT | SEAT POSITION | SEAT BELT | SAFETY DEVICE | REMARKS |
|---|---|---|---|---|---|
| 7 mph ~ 14 mph (1mph UNIT INCREASE) | NORMAL MALE | FRONT | NON-WEARING | FOLDING | ANALYZATION OF A PLURALITY OF INJURY COMBINATIONS FOR EACH VEHICLE TYPE → DERIVATION OF FOLDING/ UNFOLDING REFERENCE SPEED |
| | | CENTER | | A/BAG UNFOLDING (SEAT BELT NON-WEARING) | |
| | SMALL FEMALE | REAR | WEARING | PT Only UNFOLDING (SEAT BELT WEARING) | |
| | | | | A/BAG&PT UNFOLDING (SEAT BELT WEARING) | |

FIG. 4

| CLASSIFICATION | | SEAT BELT | COLLISION SPEED | | | | | | | |
|---|---|---|---|---|---|---|---|---|---|---|
| | | | 7mph | 8mph | 9mph | 10mph | 11mph | 12mph | 13mph | 14mph |
| PRIOR ART | | NOT RELEVANT | (FOLDING) | | AIR BAG UNFOLDING | FOLDING | (AIR BAG UNFOLDING) | | | UNFOLDING |
| THIS TECHNIQUE | NON-WEARING | | FOLDING | | | | | | | |
| | WEARING | | | | | | PT Only UNFOLDING | | | PT + AIR BAG UNFOLDING |

VEHICLE AND CONTROL METHOD THEREOF

CROSS-REFERENCE TO RELATED APPLICATION

This application is based on and claims priority under 35 U.S.C. § 119 to Korean Patent Application No. 10-2020-0128470, filed on Oct. 6, 2020, the disclosure of which is incorporated by reference herein in its entirety.

TECHNICAL FIELD

The disclosure relates to a vehicle and a control method thereof.

BACKGROUND

In general, safety devices for vehicles such as seat belts and air bags are devices capable of preventing major injuries by elastically defending the body of a passenger in a vehicle when a sudden impact is applied due to contact or collision while driving. However, in the prior art, it is difficult to develop the performance of a safety device according to various collision performances due to the same test conditions and the same safety device unfolding criteria regardless of vehicle type when a crash occurs.

In addition, these conditions are not reflected in the development of the safety device unfolding performance depending on various conditions, such as whether the passenger in the vehicle is male or female, the position of a seat on which the passenger exists, and whether the passenger wears a seat belt.

SUMMARY

It is an aspect of the disclosure to provide a vehicle including a configuration of determining whether to control a safety device based on at least one of the type of vehicle, a collision speed, a seat position of an occupant, whether the occupant wears a seat belt, the gender of the occupant, whether the occupant is an infant, and the predicted collision position of the vehicle.

It is another aspect of the disclosure to provide a vehicle including a configuration of determining an unfolding speed of the safety device.

Additional aspects of the disclosure will be set forth in part in the description which follows and, in part, will be obvious from the description, or may be learned by practice of the disclosure.

In accordance with an aspect of the disclosure, a vehicle includes a safety device, a camera sensor to detect an obstacle around the vehicle, a radar sensor to detect an obstacle around the vehicle, and a controller configured to predict a collision state and a collision position of the vehicle through the camera sensor and the radar sensor, determine whether to control the safety device based on at least one of the type of the vehicle, a collision speed, a seat position of an occupant, whether the occupant wears a seat belt, the gender of the occupant, whether the occupant is an infant and the size of the occupant, in response to the prediction result, and control the safety device depending on whether to control the safety device.

The controller may determine an unfolding speed of the safety device.

The controller may predict that the collision position of the vehicle is in a direction of a driver seat when an overlap ratio detected by the camera sensor is 0% or more and less than 50%, a difference between an absolute value of acceleration detected by a front collision detection sensor mounted in the direction of the driver seat and an absolute value of acceleration detected by a front collision detection sensor mounted in a direction of a passenger seat is greater than a first value, and an acceleration detected by an air bag control unit (ACU) is greater than a second value.

The controller may predict that the collision position of the vehicle is in a direction of a passenger seat when an overlap ratio detected by the camera sensor is 50% or more and 100% or less, a difference between an absolute value of acceleration detected by a front collision detection sensor mounted in a direction of a driver seat and an absolute value of acceleration detected by a front collision detection sensor mounted in the direction of the passenger seat is less than a third value, and an acceleration detected by an air bag control unit (ACU) is less than a fourth value.

The safety device may include at least one of a driver air bag (DAB), a passenger air bag (PAB), and a pretensioner (PT).

The controller may control at least one of a driver air bag (DAB) and a passenger air bag (PAB) to operate based on the seat position of the occupant when the collision speed of the vehicle is 9 mph or more and 14 mph or less and the occupant does not wear a seat belt.

The controller may control a pretensioner (PT) to operate based on the seat position of the occupant when the collision speed of the vehicle is 11 mph and the occupant wears a seat belt.

The controller may control a pretensioner (PT) to operate, and at least one of a driver air bag (DAB) and a passenger air bag (PAB) to operate, based on the seat position of the occupant when the collision speed of the vehicle is 14 mph or more and the occupant wears a seat belt.

The collision position of the vehicle may be at least one of a direction of a driver seat and a direction of a passenger seat.

In accordance with another aspect of the disclosure, a control method of a vehicle includes predicting a collision state and a collision position of the vehicle through a camera sensor and a radar sensor, determining whether to control a safety device based on at least one of the type of the vehicle, a collision speed, a seat position of an occupant, whether the occupant wears a seat belt, the gender of the occupant, whether the occupant is an infant and the size of the occupant, in response to the prediction result, and controlling the safety device depending on whether to control the safety device.

The control method may further include determining an unfolding speed of the safety device.

The control method may further include predicting that the collision position of the vehicle is in a direction of a driver seat when an overlap ratio detected by the camera sensor is 0% or more and less than 50%, a difference between an absolute value of acceleration detected by a front collision detection sensor mounted in the direction of the driver seat and an absolute value of acceleration detected by a front collision detection sensor mounted in a direction of a passenger seat is greater than a first value, and an acceleration detected by an air bag control unit (ACU) is greater than a second value.

The control method may further include predicting that the collision position of the vehicle is in a direction of a passenger seat when an overlap ratio detected by the camera sensor is 50% or more and 100% or less, a difference between an absolute value of acceleration detected by a front collision detection sensor mounted in a direction of a driver seat and an absolute value of acceleration detected by a front collision detection sensor mounted in the direction of the passenger seat is less than a third value, and an acceleration detected by an air bag control unit (ACU) is less than a fourth value.

The safety device may include at least one of a driver air bag (DAB), a passenger air bag (PAB), and a pretensioner (PT).

The control method may further include controlling at least one of a driver air bag (DAB) and a passenger air bag (PAB) to operate based on the seat position of the occupant when the collision speed of the vehicle is 9 mph or more and 14 mph or less and the occupant does not wear a seat belt.

The control method may further include controlling a pretensioner (PT) to operate based on the seat position of the occupant when the collision speed of the vehicle is 11 mph and the occupant wears a seat belt.

The control method may further include controlling a pretensioner (PT) to operate, and at least one of a driver air bag (DAB) and a passenger air bag (PAB) to operate, based on the seat position of the occupant when the collision speed of the vehicle is 14 mph or more and the occupant wears a seat belt.

The collision position of the vehicle is at least one of a direction of a driver seat and a direction of a passenger seat.

DRAWINGS

These and/or other aspects of the disclosure will become apparent and more readily appreciated from the following description of the forms, taken in conjunction with the accompanying drawings of which:

FIG. 3 is a table for determining whether to control a safety device of the vehicle in one form of the present disclosure;

FIG. 4 is a table for determining whether to control the safety device according to a collision speed of the vehicle in one form of the present disclosure;

DETAILED DESCRIPTION

Figure 1:
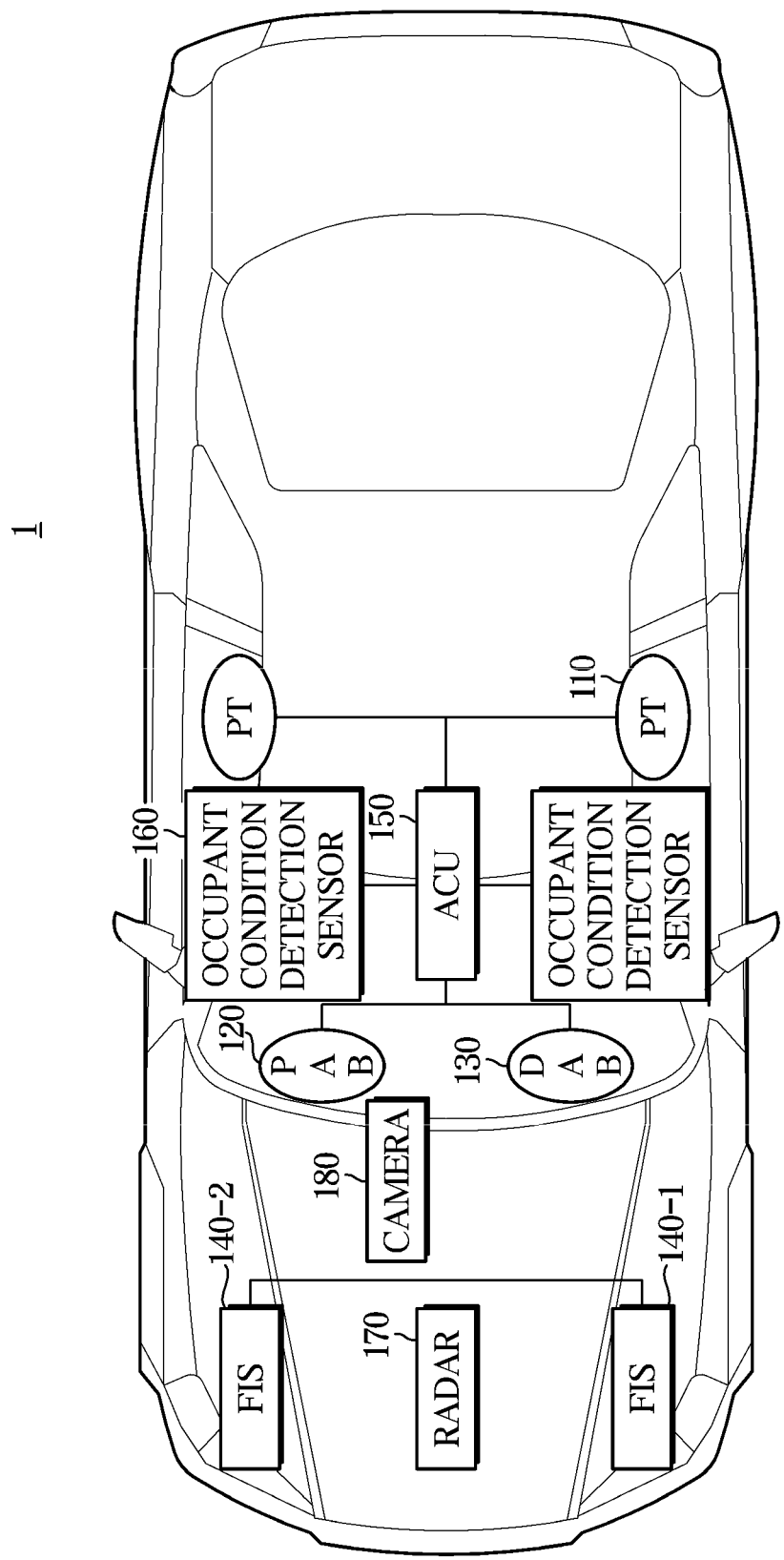
FIG. 1 is a plan view of a vehicle in one form of the present disclosure.

Like reference numerals refer to like elements throughout the specification. This specification does not describe all the elements of the forms, and duplicative contents between general contents or forms in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to forms.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case where one member is adjacent to the other member, but also a case where another member is placed between the two members.

The terms 'first,' 'second,' etc. are used to distinguish one element from another element, and the elements are not limited by the above-mentioned terms.

The singular forms and the include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter the disclosure will be described in detail with reference to the accompanying drawings.

FIG. 1 is a plan view of a vehicle in some forms of the disclosure.

As shown in FIG. 1, a vehicle 1 may include at least one of a belt pretensioner (PT) 110, a passenger air bag (PAB) 120, a driver air bag (DAB) 130, a front impact sensors (FIS) 140-1 and 140-2, an air bag control unit (ACU) 150, an occupant condition detection sensor 160, a radar sensor 170, and a camera sensor 180.

The occupant condition detection sensor 160 may include at least one of an occupant detection sensor (ODS) to detect a seat position of an occupant and the type of the occupant, a seat traction position sensor (STPS), and a buckle detection sensor (B/S).

The type of occupant may be a normal male, small female, or infant, but is not limited thereto.

The ACU 150 may control the seat air bag 130, the passenger air bag 120, and the belt pretensioner 110 based on the detection result of at least one of the front collision detection sensors 140-1 and 140-2 and the occupant condition detection sensor 160.

Figure 2:
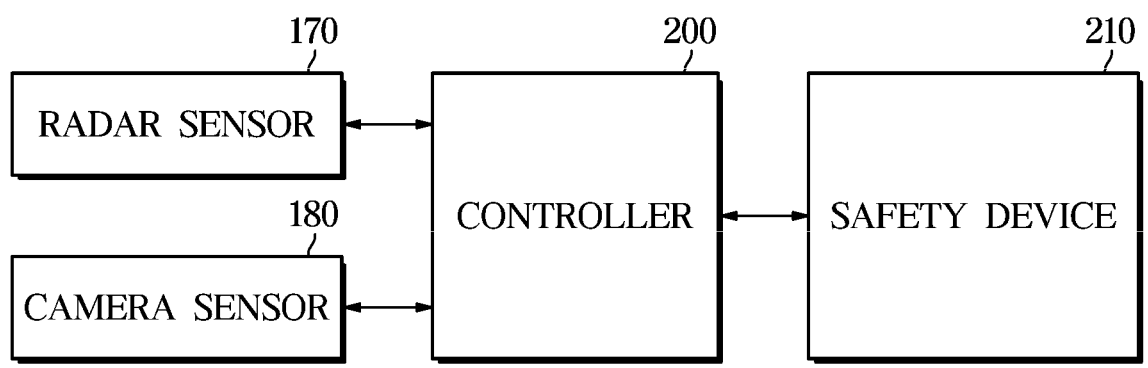
FIG. 2 is a control block diagram of the vehicle in one form of the present disclosure.

FIG. 2 is a control block diagram of the vehicle in some forms of the disclosure.

Referring to FIG. 2, the vehicle 1 may include a safety device 210, the camera sensor 180 for detecting obstacles around the vehicle 1, the radar sensor 170 for detecting obstacles around the vehicle 1, and a controller 200 configured to predict a collision state of the vehicle 1 and a collision position of the vehicle 1 through the camera sensor 180 and the radar sensor 170, determine whether to control the safety device 210 based on at least one of the type of the vehicle 1, a collision speed, a seat position of an occupant, whether the occupant wears a seat belt, the gender of the occupant, whether the occupant is an infant and the size of the occupant, in response to the prediction result, and control the safety device 210 depending on whether to control the safety device 210.

The safety device 210 may include the belt pretensioner 110, the passenger air bag 120, and the driver air bag 130.

Although not shown, the safety device 210 may further include a front side air bag (FSAB), a rear side air bag (RSAB), and a rear air bag (RAB).

The controller 200 may receive external obstacle detection information through a controller area network (CAN) outside the vehicle 1 through the camera sensor 180 and the radar sensor 170.

The controller 200 may receive information on a relative speed and collision time sensed by the radar sensor 170 through the controller area network (CAN).

When a relative speed of the vehicle 1 with an external obstacle is greater than a predetermined speed and a predicted collision time is less than a predetermined time, the controller 200 may predict that the vehicle 1 will collide.

The controller 200 may receive occupant seat position information, occupant type information, and seat belt wearing information through the occupant condition detection sensor 160.

The controller 200 may receive overlap ratio information of the vehicle 1 through the controller area network (CAN).

Herein, the overlap ratio information may be a ratio of 0% or more and 100% or less.

Some forms of the disclosure describe that information on the vehicle 1 is received through the CAN, but is not limited thereto.

When it is predicted that the vehicle 1 will collide, the controller 200 may determine whether the overlap ratio detected by the camera sensor 180 is 0% or more and less than 50%, or 50% or more and 100% or less.

When it is predicted that the vehicle 1 will collide, the controller 200 may calculate a difference between an absolute value of acceleration detected by the front collision detection sensor 140-1 mounted in a direction of the driver seat and an absolute value of acceleration detected by the front collision detection sensor 140-2 mounted in a direction of the passenger seat.

When it is predicted that the vehicle 1 will collide, the controller 200 may determine the acceleration detected by the ACU 150.

For example, when the overlap ratio detected by the camera sensor 180 is 0% or more and less than 50%, the difference between the absolute value of acceleration detected by the front collision detection sensor 140-1 mounted in the direction of the driver seat and the absolute value of acceleration detected by the front collision detection sensor 140-2 mounted in the direction of the passenger seat is greater than a first value, and the acceleration detected by the ACU is greater than a second value, the controller 200 may predict that a collision position of the vehicle 1 is in the direction of the driver seat.

For example, when the overlap ratio detected by the camera sensor 180 is 50% or more and 100% or less, the difference between the absolute value of acceleration detected by the front collision detection sensor 140-1 mounted in the direction of the driver seat and the absolute value of acceleration detected by the front collision detection sensor 140-2 mounted in the direction of the passenger seat is less than a third value, and the acceleration detected by the ACU is less than a fourth value, the controller 200 may predict that the collision position of the vehicle is in the direction of the passenger seat.

In order to determine whether to control the safety device 210, the controller 200 may reflect a difference in collision performance depending on a difference in platforms or indoor specifications for each type of the vehicle 1.

The controller 200 may determine whether the occupant is a normal male or a small female and whether the occupant is an infant, based on the result detected by the occupant condition detection sensor 160.

When there are two or more occupants in the vehicle 1, based on a result detected by the occupant condition detection sensor 160, the controller 200 may determine a seat position of each occupant, whether each occupant wears a seat belt, and the gender and size of each occupant.

The controller 200 may control the belt pretensioner 110 and transmit a control signal for controlling at least one of the passenger air bag 120 and the driver air bag 130 to the ACU 150.

The controller 200 may determine an unfolding speed of at least one of the belt pretensioner 110, the passenger air bag 120, and the driver air bag 130 and may transmit unfolding speed information to the ACU 150.

The unfolding speed may be a collision speed at which the air bag swells in a fixed wall collision in a specific area to prevent injury to the occupant when the air bag is controlled.

For example, when the collision speed of the vehicle 1 is 9 mph or more and 14 mph or less, and the occupant does not wear a seat belt, the controller 200 may control at least one of the passenger air bag 120, the driver air bag 130, the front side air bag (FSAB), the rear side air bag (RSAB), and the rear air bag (RAB) based on the seat position of the occupant.

In more detail, the controller 200 may control at least one of the passenger air bag 120, the driver air bag 130, the front side air bag (FSAB), the rear side air bag (RSAB), and the rear air bag (RAB) by the ACU 150.

For example, when the collision speed of the vehicle 1 is 11 mph and the occupant wears a seat belt, the controller 200 may control the belt pretensioner 110 based on the seat position of the occupant.

For example, when the collision speed of the vehicle 1 is 14 mph and the occupant wears a seat belt, based on the seat position of the occupant, the controller 200 may control the belt pretensioner 110 and control at least one of the passenger air bag 120, the driver air bag 130, the front side air bag (FSAB), the rear side air bag (RSAB), and the rear air bag (RAB).

The controller 200 may be implemented as a memory (not shown) that stores data on an algorithm for controlling operations of components in the vehicle 1 or a program that reproduces the algorithm, and a processor (not shown) for performing the operations by using the data stored in the memory. In this case, the memory and the processor may be implemented as a separate chip, respectively. Alternatively, the memory and the processor may be implemented as a single chip.

A storage unit (not shown) may correspond to a memory that stores the above-described information and the following information and may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto.

FIG. 3 is a table for determining whether to control a safety device of the vehicle in some forms of the disclosure.

FIG. 3 shows a table in which an actual experiment is conducted by combining the cases in which the collision speed of the vehicle 1 is 7 mph or more and 14 mph or less, the occupants are in the driver seat and passenger seat, the occupant is a normal male or small female, and the seat positions of the occupants are the front position, the center position, and the rear position, and based on whether the occupant wears a seat belt, the safety device 210 does not operate, the air bag is operated, the belt pretensioner 110 is operated, and the air bag and the belt pretensioner 110 are all operated.

The vehicle 1 may analyze a plurality of injury combinations for each vehicle type, determine whether to control the safety device 210 through an actual experiment in the order of a sled test and an actual vehicle test, and determine the unfolding speed of the safety device 210.

FIG. 4 is a table for determining whether to control the safety device according to a collision speed of the vehicle in some forms of the disclosure.

While conventionally, in the same manner regardless of the type of vehicle, the front safety device in the case of a 10 mph fixed wall frontal collision does not operate, and all the frontal safety devices in a 14 mph fixed wall frontal collision are controlled to operate, the vehicle 1 in some forms of the disclosure may determine whether to control the safety device depending on the collision speed of each vehicle type and cases where the occupant wears and does not wear a seat belt.

For example, when the collision speed of the vehicle 1 is 7 mph or less and the occupant does not wear a seat belt, the vehicle 1 may control both the DAB (driver air bag) and the PAB (passenger air bag) not to operate.

For example, when the collision speed of the vehicle 1 is 9 mph or more and 14 mph or less and the occupant does not wear a seat belt, the vehicle 1 may control at least one of the DAB (driver air bag) and the PAB (passenger air bag) not to operate, based on the seat position of the occupant.

For example, when the collision speed of the vehicle 1 is 14 mph or more and the occupant wears a seat belt, the vehicle 1 may control at least one of the DAB (driver air bag) and the PAB (passenger air bag) not to operate.

For example, when the collision speed of the vehicle 1 is 11 mph and the occupant wears a seat belt, the vehicle 1 may control to operate the belt pretensioner 110 based on the seat position of the occupant.

The belt pretensioner 110 may have a function of winding the belt pulled by the occupant according to its own weight when the seat belt operates normally, and may have a function of forcibly winding a portion of the seat belt when a vehicle collision occurs.

Figure 5:
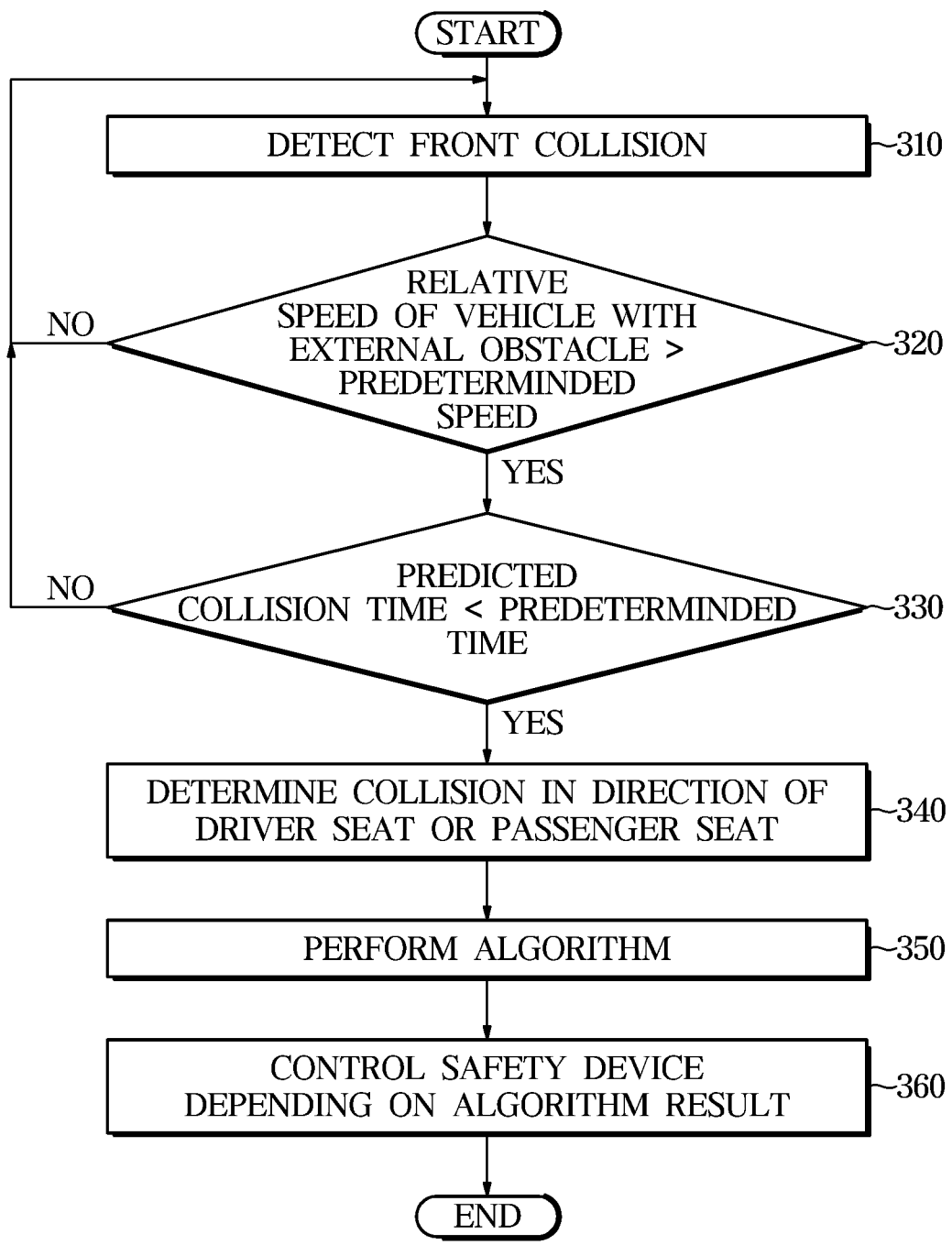
FIG. 5 is a flowchart of a control method of a vehicle in one form of the present disclosure.

FIG. 5 is a flowchart of a control method of a vehicle in some forms of the disclosure.

The vehicle 1 may detect whether an obstacle exists outside the vehicle 1 and determine a collision state (310).

In more detail, the vehicle 1 may receive obstacle detection information detected through the camera sensor 180 and the radar sensor 170. Also, the vehicle 1 may receive relative speed information and collision time information through the radar sensor 170.

The vehicle 1 may determine whether a relative speed of the vehicle 1 with an external obstacle is faster than a predetermined speed (320).

When the relative speed of the vehicle 1 with the external obstacle is faster than the predetermined speed, the vehicle 1 may determine whether a predicted collision time between the vehicle 1 and the external obstacle is less than a predetermined time (330).

When the predicted collision time between the vehicle 1 and the external obstacle is less than the predetermined time, the vehicle 1 may determine whether a collision position between the vehicle 1 and the external obstacle is in the direction of the driver seat or the direction of the passenger seat (340).

For example, when the overlap ratio detected by the camera sensor 180 is 0% or more and less than 50%, the difference between the absolute value of acceleration detected by the front collision detection sensor 140-1 mounted in the direction of the driver seat and the absolute value of acceleration detected by the front collision detection sensor 140-2 mounted in the direction of the passenger seat is greater than the first value, and the acceleration detected by the ACU is greater than the second value, the vehicle 1 may predict that the collision position of the vehicle 1 is in the direction of the driver seat.

For example, when the overlap ratio detected by the camera sensor 180 is 50% or more and 100% or less, the difference between the absolute value of acceleration detected by the front collision detection sensor 140-1 mounted in the direction of the driver seat and the absolute value of acceleration detected by the front collision detection sensor 140-2 mounted in the direction of the passenger seat is less than the third value, and the acceleration detected by the ACU is less than the fourth value, the vehicle 1 may predict that the collision position of the vehicle 1 is in the direction of the passenger seat.

The vehicle 1 may determine whether the collision position between the vehicle 1 and the external obstacle is in the seat direction of the driver or the seat direction of the passenger and may perform an algorithm for controlling the safety device 210 by reflecting the determination result (350).

The vehicle 1 may determine an unfolding speed of the safety device 210 according to the result of performing the algorithm and determine whether the safety device 210 operates.

The vehicle 1 may control the safety device 210 based on the unfolding speed and whether the safety device 210 operates (360).

Figure 6:
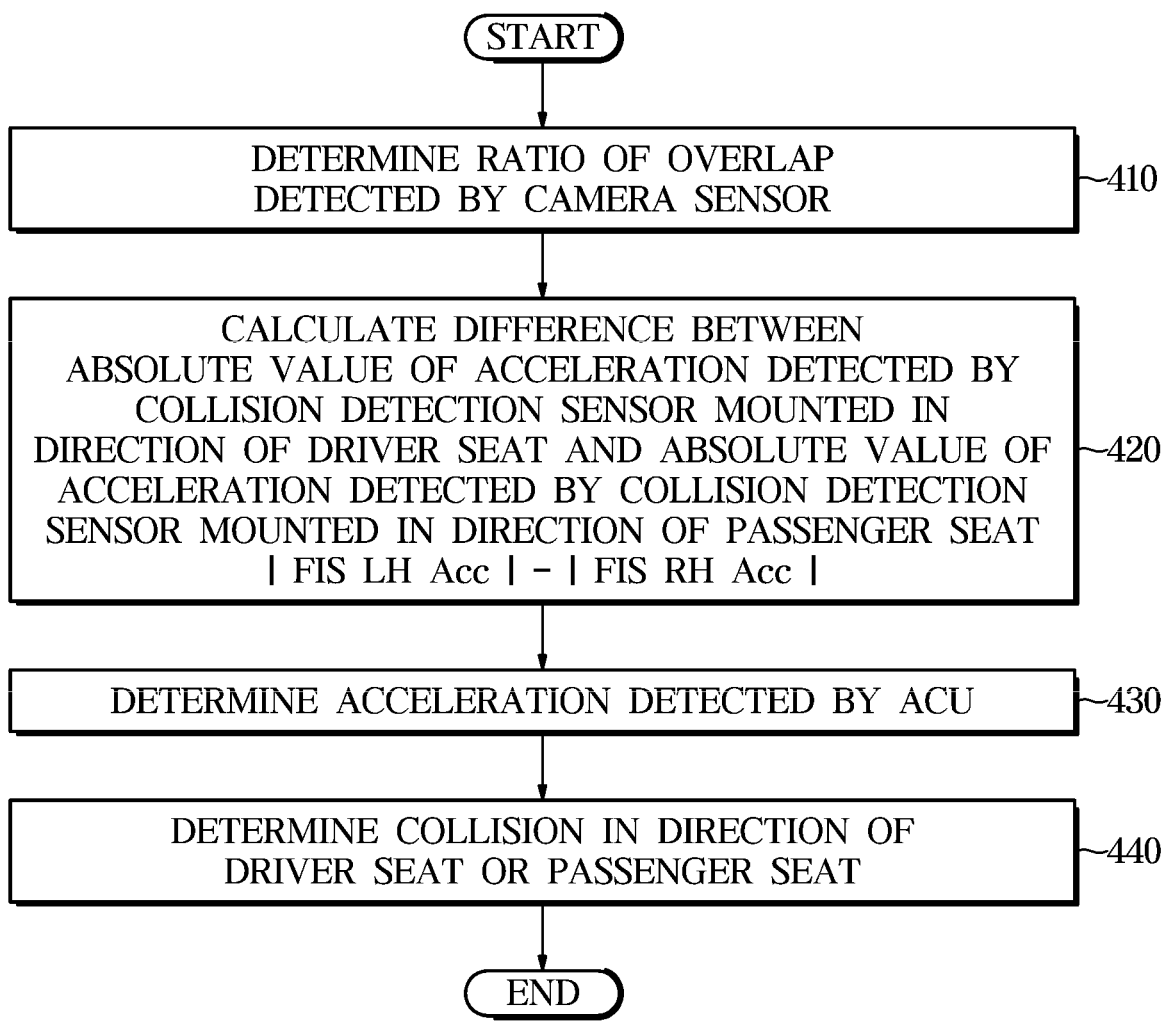
FIG. 6 is a flowchart of determining a collision location of a vehicle in one form of the present disclosure.

FIG. 6 is a flowchart of determining a collision location of a vehicle in some forms of the disclosure.

The vehicle 1 may determine overlap ratio information of the obstacle detected through the camera sensor 180 of the vehicle 1 (410).

For example, when an overlap ratio of an obstacle is 0% or more and less than 50%, the vehicle 1 may determine that the obstacle exists in a front left of the vehicle 1 and predict that the collision position is in the direction of the driver seat. When the overlap ratio of an obstacle is 50% or more and 100% or less, the vehicle 1 may determine that the obstacle exists in a front right of the vehicle 1 and predict that the collision position is in the direction of the passenger seat.

The vehicle 1 may calculate a difference between an absolute value of acceleration detected by the front collision detection sensor 140-1 mounted in the direction of the driver seat and an absolute value of acceleration detected by the front collision detection sensor 140-2 mounted in the direction of the passenger seat (420).

In more detail, when the difference between the absolute value of acceleration detected by the front collision detection sensor 140-1 mounted in the direction of the driver seat and the absolute value of acceleration detected by the front collision detection sensor 140-2 mounted in the direction of the passenger seat is greater than the first value, the vehicle 1 may determine that the acceleration detected by the front collision detection sensor 140-1 mounted in the direction of the driver seat is greater and may determine that the collision position is in the direction of the driver seat.

Herein, the first value may be a positive number.

In more detail; when the difference between the absolute value of acceleration detected by the front collision detection sensor 140-1 mounted in the direction of the driver seat and the absolute value of acceleration detected by the front collision detection sensor 140-2 mounted in the direction of the passenger seat is less than the third value, the vehicle 1 may determine that the acceleration detected by the front collision detection sensor 140-2 mounted in the direction of the passenger seat is greater and may determine that the collision position is in the direction of the passenger seat.

Herein, the third value may be a negative number.

The vehicle 1 may determine an acceleration detected by the ACU 150 (440).

In more detail, vehicle 1 may determine that the collision position is in the direction of the driver seat when the acceleration detected by the ACU 150 is greater than the second value, and may determine that the collision position is in the direction of the passenger seat when the acceleration detected by the ACU 150 is less than the fourth value.

Herein, the second value may be a positive number, and the fourth value may be a negative number.

Figure 7:
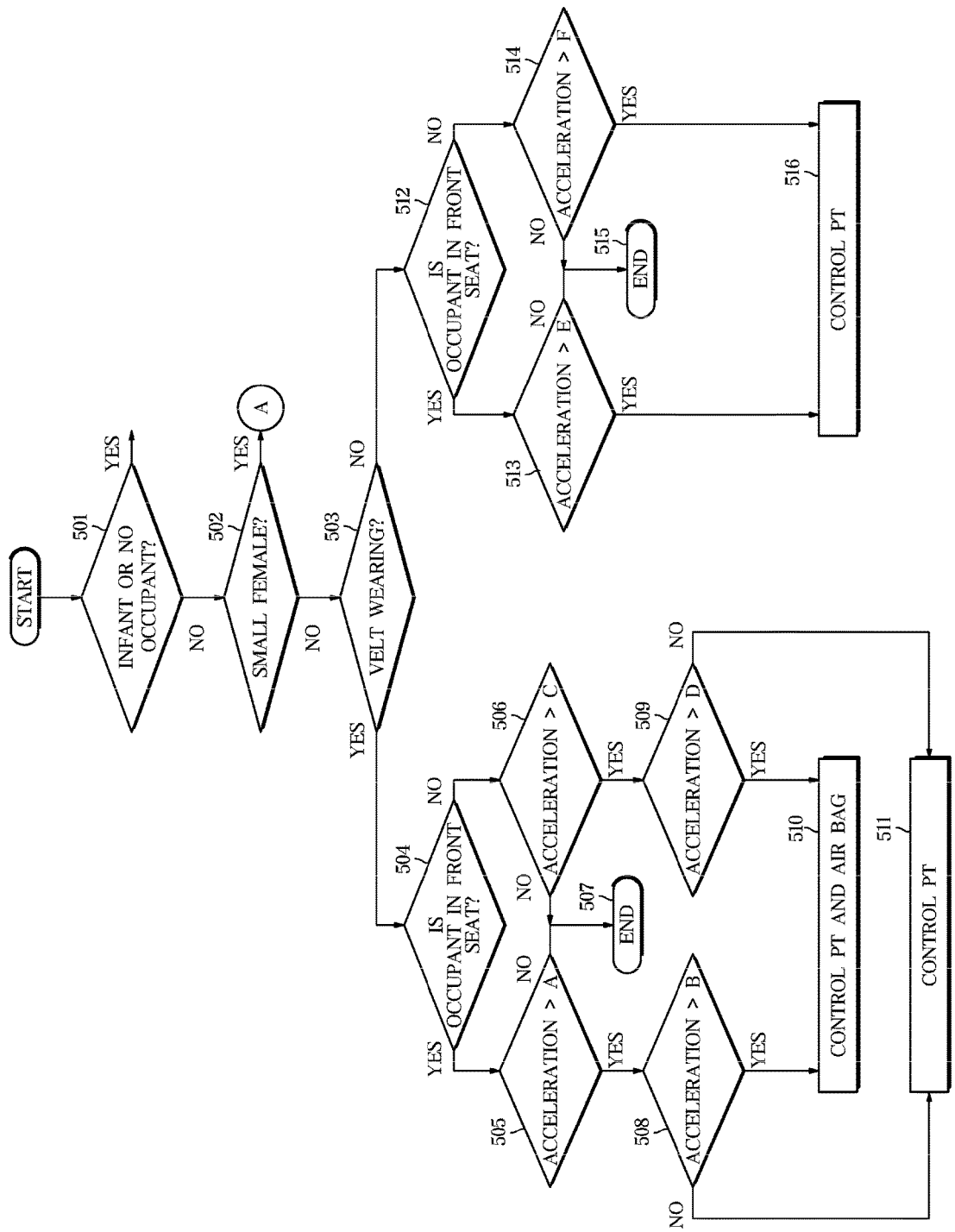
FIGS. 7 and 8 are algorithm flowcharts of a vehicle in one form of the present disclosure.
Figure 8:
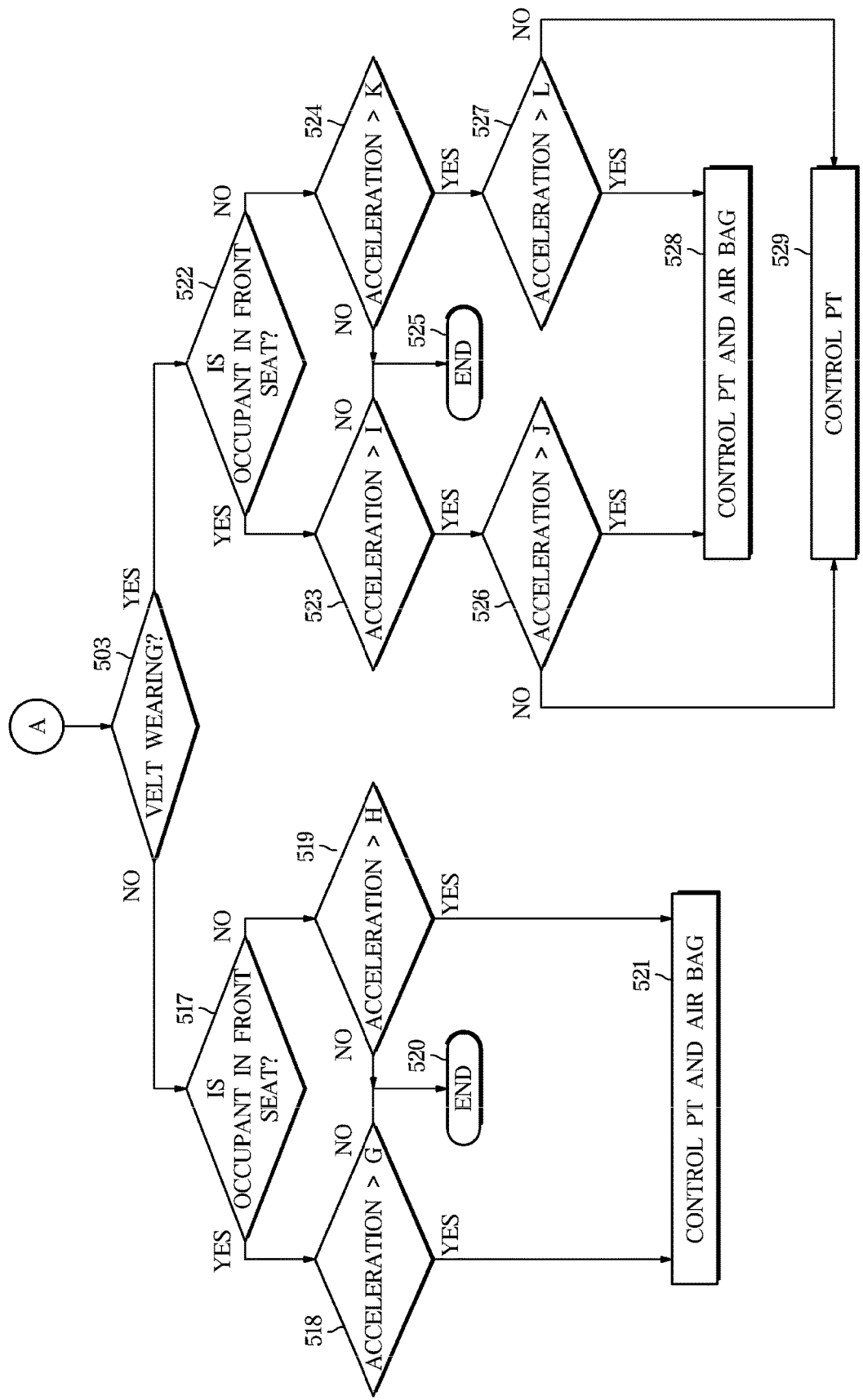

FIGS. 7 and 8 are algorithm flowcharts of a vehicle in some forms of the disclosure.

The vehicle 1 may determine whether there is an occupant in the vehicle 1 and whether there is an infant in the vehicle 1 (501).

When there is an occupant in the vehicle 1, but the occupant is not an infant, the vehicle 1 may determine whether the occupant is a small female (502).

Herein, the small female may refer to an occupant that is smaller in size than an occupant of a predetermined size.

When there is no small female in the vehicle 1, the vehicle 1 may determine whether the occupant wears a seat belt (503).

When the occupant wears a seat belt, the vehicle 1 may determine whether the occupant is in a front position in a seat in the vehicle 1 (504).

When the occupant is in the front position in a seat in the vehicle 1, the vehicle 1 may determine whether the acceleration is greater than an A value, and when the occupant is not in the front position in a seat in the vehicle 1, the vehicle 1 may determine whether the acceleration is greater than a C value (505 and 506).

When the acceleration is less than the A value and less than the C value, the vehicle 1 may control the safety device 210 not to operate (507).

In a case where the occupant is in the front position in a seat in the vehicle 1, when the acceleration is greater than the A value, the vehicle 1 may again determine whether the acceleration is greater than a B value, and in a case where the occupant is not in the front position in a seat in the vehicle 1, when the acceleration is greater than the C value, the vehicle 1 may again determine whether the acceleration is greater than a D value (508 and 509).

When the acceleration is greater than the B value and greater than the D value, the vehicle 1 may control the belt pretensioner 110 to operate and the air bag to operate depending on the seat position of the occupant (510).

When the acceleration is less than the B value and less than the D value, the vehicle 1 may control the belt pretensioner 110 to operate depending on the seat position of the occupant (511).

When the occupant does not wear a seat belt, the vehicle 1 may determine whether the occupant is in the front position in a seat in the vehicle 1 (512).

When the occupant is in the front position in a seat in the vehicle 1, the vehicle 1 may determine whether the acceleration is greater than an E value, and when the occupant is not in the front position in a seat in the vehicle 1, the vehicle 1 may determine whether the acceleration is greater than an F value (513 and 514).

When the acceleration is less than the E value and less than the F value, the vehicle 1 may control the safety device 210 not to operate (515).

When the acceleration is greater than the E value and greater than the F value, the vehicle 1 may control the belt pretensioner 110 to operate and the air bag to operate depending on the seat position of the occupant (516).

When there is no small female in the vehicle 1, the vehicle 1 may determine whether the occupant wears a seat belt (503).

When the occupant does not wear a seat belt, the vehicle 1 may determine whether the occupant is in the front position in a seat in the vehicle 1 (517).

When the occupant is in the front position in a seat in the vehicle 1, the vehicle 1 may determine whether the acceleration is greater than a G value, and when the occupant is not in the front position in a seat in the vehicle 1, the vehicle 1 may determine whether the acceleration is greater than a H value (518 and 519).

When the acceleration is less than the G value and less than the H value, the vehicle 1 may control the safety device 210 not to operate (520).

When the acceleration is greater than the G value and greater than the H value, the vehicle 1 may control the belt pretensioner 110 to operate and the air bag to operate depending on the seat position of the occupant (521).

When the occupant wears a seat belt, the vehicle 1 may determine whether the occupant is in the front position in a seat in the vehicle 1 (522).

When the occupant is in the front position in a seat in the vehicle 1, the vehicle 1 may determine whether the acceleration is greater than an I value, and when the occupant is not in the front position in a seat in the vehicle 1, the vehicle 1 may determine whether the acceleration is greater than a K value (523 and 524).

When the acceleration is less than the I value and less than the K value, the vehicle 1 may control the safety device 210 not to operate (525).

In the case where the occupant is in the front position in a seat in the vehicle 1, when the acceleration is greater than the I value, the vehicle 1 may again determine whether the acceleration is greater than a J value, and in the case where the occupant is not in the front position in a seat in the vehicle 1, when the acceleration is greater than a K value, the vehicle 1 may again determine whether the acceleration is greater than a L value (526 and 527).

When the acceleration is greater than the J value and greater than the L value, the vehicle 1 may control the belt pretensioner 110 to operate and the air bag to operate depending on the seat position of the occupant (528).

When the acceleration is less than the J value and less than the L value, the vehicle 1 may control the belt pretensioner 110 to operate depending on the seat position of the occupant (529).

Herein, the A value, the B value, the C value, the D value, the E value, the F value, the G value, the H value, the I value, the J value, the K value, and the L value may be predetermined values.

Some forms of the present disclosure may be implemented in the form of a recording medium storing instructions executable by a computer. The instructions may be stored in the form of program code, and when executed by a processor, a program module may be created to perform the operations of the disclosed forms. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, in some forms of the disclosure, because the speed and strategy of a safety device are determined based on the type of vehicle, a seat position of an occupant in the vehicle, age of the occupant, and the gender of the occupant, collision safety performance can be improved.

In more detail, conventionally, in the development of the unfolding performance of the safety device, the unfolding speed and the unfolding criterion of the safety device are applied under the same condition as the type of the entire vehicles, so that differences in different collision performances for each vehicle type are not reflected in the unfolding performance and it is difficult to confirm the effect of improving injury depending on the condition of the occupant. However, in the vehicle in some forms of the disclosure, the vehicle body platform and interior specifications of each vehicle type can be reflected in the unfolding process of the safety device during a collision, and based on the type of occupant (for example, whether it is an infant, male or female), the condition of the occupant, and the location of the vehicle's collision, the safety device unfolding speed and unfolding strategy that can minimize occupant injury can be classified and determined. For this reason, in the case of an actual accident, an improvement in collision safety performance can be expected.

In addition, it is possible to analyze according to various conditions and develop a standard for minimizing occupant injury through a sled test and an actual vehicle test, so that the safety device unfolding performance development standard can be established.

While the disclosure has been particularly described with reference to exemplary forms, it should be understood by those of skilled in the art that various changes in form and details may be made without departing from the spirit and scope of the disclosure.

What is claimed is:

1. A vehicle comprising:
a safety device;
a camera sensor to detect an obstacle around the vehicle;
a radar sensor to detect the obstacle around the vehicle; and
a controller configured to:
predict a collision state and a collision position of the vehicle through the camera sensor and the radar sensor;
determine whether to control the safety device based on at least one of a vehicle type, a collision speed, a seat position of an occupant, whether the occupant wears a seat belt, a gender of the occupant, whether the occupant is an infant, or a size of the occupant, in response to a prediction result; and
control the safety device depending on a determination result.

2. The vehicle according to claim 1, wherein the controller is configured to:
determine an unfolding speed of the safety device.

3. The vehicle according to claim 1, wherein the controller is configured to:
predict that the collision position of the vehicle is in a direction of a driver seat when:
an overlap ratio detected by the camera sensor is greater than or equal to 0% and less than 50%,
a difference between an absolute value of acceleration detected by a front collision detection sensor mounted in the direction of the driver seat and an absolute value of acceleration detected by a front collision detection sensor mounted in a direction of a passenger seat is greater than a first value, and
an acceleration detected by an air bag control unit (ACU) is greater than a second value.

4. The vehicle according to claim 1, wherein the controller is configured to:
predict that the collision position of the vehicle is in a direction of a passenger seat when:
an overlap ratio detected by the camera sensor is greater than or equal to 50% and equal to or less than 100%,
a difference between an absolute value of acceleration detected by a front collision detection sensor mounted in a direction of a driver seat and an absolute value of acceleration detected by a front collision detection sensor mounted in the direction of the passenger seat is less than a third value, and
an acceleration detected by an air bag control unit (ACU) is less than a fourth value.

5. The vehicle according to claim 1, wherein the safety device comprises at least one of a driver air bag (DAB), a passenger air bag (PAB), or a pretensioner (PT).

6. The vehicle according to claim 1, wherein the controller is configured to:
control at least one of a driver air bag (DAB) or a passenger air bag (PAB) to operate based on the seat position of the occupant when the collision speed of the vehicle is greater than or equal to 9 mph and less than or equal to 14 mph, and the occupant does not wear a seat belt.

7. The vehicle according to claim 1, wherein the controller is configured to:
control a pretensioner (PT) to operate based on the seat position of the occupant when the collision speed of the vehicle is 11 mph and the occupant wears a seat belt.

8. The vehicle according to claim 1, wherein the controller is configured to:
control a pretensioner (PT) and at least one of a driver air bag (DAB) or a passenger air bag (PAB) to operate based on the seat position of the occupant when the collision speed of the vehicle is greater than or equal to 14 mph and the occupant wears a seat belt.

9. The vehicle according to claim 1, wherein the collision position of the vehicle is at least one of a direction of a driver seat or a direction of a passenger seat.

10. A control method of a vehicle comprising:
predicting, by a camera sensor and a radar sensor, a collision state and a collision position of the vehicle;
determining whether to control a safety device based on at least one of a vehicle type, a collision speed, a seat position of an occupant, whether the occupant wears a seat belt, a gender of the occupant, whether the occupant is an infant or a size of the occupant, in response to a prediction result; and
controlling the safety device depending on a determination result.

11. The control method according to claim 10, further comprising:
determining an unfolding speed of the safety device.

12. The control method according to claim 10, further comprising:
predicting that the collision position of the vehicle is in a direction of a driver seat when:
an overlap ratio detected by the camera sensor is greater than or equal to 0% and less than 50%,
a difference between an absolute value of acceleration detected by a front collision detection sensor mounted in the direction of the driver seat and an absolute value of acceleration detected by a front collision detection sensor mounted in a direction of a passenger seat is greater than a first value, and
an acceleration detected by an air bag control unit (ACU) is greater than a second value.

13. The control method according to claim 10, further comprising:
predicting that the collision position of the vehicle is in a direction of a passenger seat when:
an overlap ratio detected by the camera sensor is greater than or equal to 50% and less than or equal to 100%,
a difference between an absolute value of acceleration detected by a front collision detection sensor mounted in a direction of a driver seat and an absolute value of acceleration detected by a front collision detection sensor mounted in the direction of the passenger seat is less than a third value, and
an acceleration detected by an air bag control unit (ACU) is less than a fourth value.

14. The control method according to claim 10, wherein the safety device comprises at least one of a driver air bag (DAB), a passenger air bag (PAB), or a pretensioner (PT).

15. The control method according to claim 10, further comprising:
controlling at least one of a driver air bag (DAB) or a passenger air bag (PAB) to operate based on the seat position of the occupant when the collision speed of the vehicle is greater than or equal to 9 mph and less than or equal to 14 mph and the occupant does not wear a seat belt.

16. The control method according to claim 10, further comprising:
controlling a pretensioner (PT) to operate based on the seat position of the occupant when the collision speed of the vehicle is 11 mph and the occupant wears a seat belt.

17. The control method according to claim 10, further comprising:
controlling a pretensioner (PT) and at least one of a driver air bag (DAB) or a passenger air bag (PAB) to operate based on the seat position of the occupant when the collision speed of the vehicle is greater than or equal to 14 mph and the occupant wears a seat belt.

18. The control method according to claim 10, wherein the collision position of the vehicle is at least one of a direction of a driver seat or a direction of a passenger seat.

* * * * *